United States Patent
Dijkstra (10) Patent No.: US 6,789,098 B1
(45) Date of Patent: Sep. 7, 2004

(54) METHOD, DATA PROCESSING SYSTEM AND COMPUTER PROGRAM FOR COMPARING FLOATING POINT NUMBERS

(75) Inventor: Wilco Dijkstra, Cherry Hinton (GB)

(73) Assignee: Arm Limited, Cambridge (GB)

( * ) Notice: Subject to any disclaimer, the term of this patent is extended or adjusted under 35 U.S.C. 154(b) by 465 days.

(21) Appl. No.: 09/693,974

(22) Filed: Oct. 23, 2000

(51) Int. Cl.[7] .......................... G06F 7/38; G06F 15/00
(52) U.S. Cl. ..................................... 708/495; 708/200
(58) Field of Search ..................... 340/146.2; 708/495, 708/207, 497, 505, 498

(56) References Cited

U.S. PATENT DOCUMENTS

| | | | | |
|---|---|---|---|---|
| 5,166,898 A | * | 11/1992 | Ishihara ....................... | 708/505 |
| 5,357,237 A | * | 10/1994 | Bearden et al. .............. | 708/505 |
| 5,630,160 A | * | 5/1997 | Simpson et al. ............. | 708/490 |
| 6,018,756 A | * | 1/2000 | Wolrich et al. .............. | 708/505 |
| 6,058,473 A | * | 5/2000 | Guttag et al. ................ | 712/225 |
| 6,219,685 B1 | * | 4/2001 | Story ........................... | 708/498 |
| 6,298,365 B1 | * | 10/2001 | Dubey et al. ................ | 708/495 |
| 6,397,239 B2 | * | 5/2002 | Oberman et al. ........... | 708/505 |

OTHER PUBLICATIONS

Guy et al., A comparison of three roudning algorithms for IEEE floating–point multiplication, Jul. 2000, IEEE Transactions on Computers, vol. 49, No. 7, pp. 638–650.*

* cited by examiner

Primary Examiner—Kakali Chaki
Assistant Examiner—Chat Do
(74) Attorney, Agent, or Firm—Nixon & Vanderhye P.C.

(57) ABSTRACT

The present invention provides a method, data processing system and computer program for comparing first and second floating point numbers involving providing a hierarchy of tests arranged to identify from said first and second floating point numbers whether said one or more exception conditions exist. Each test is arranged to generate a hit signal if that test predicts that one or more exception conditions exist. If the executed test generates a hit signal and is not the final test in the hierarchy, the method branches to the next test in the hierarchy, executes that test and returns to the step of determining whether the executed test has generated a hit signal. If the executed test generates a hit signal and is the final test in the hierarchy, an exception signal is generated indicating the presence of one or more exception conditions.

19 Claims, 3 Drawing Sheets

METHOD, DATA PROCESSING SYSTEM AND COMPUTER PROGRAM FOR COMPARING FLOATING POINT NUMBERS

BACKGROUND OF THE INVENTION

1. Field of the Invention

The present invention relates to a method, data processing system and computer program for comparing floating point numbers.

2. Description of the Prior Art

It is common for data processing systems to be required to perform various floating point computations on data. To ensure that a consistent approach was adopted in the way in which floating point computations are handled by various data processing systems, a standard was produced in 1985 called the "IEEE Standard for Binary Floating-Point Arithmetic", ANSI/IEEE Standard 754–1985, the Institute of Electrical and Electronic Engineers, Inc., New York, 10017 (hereafter referred to as the IEEE754–1985 Standard).

Performing comparisons of floating point numbers in accordance with the IEEE754–1985 Standard is non-trivial as there are a number of exception conditions which need to be identified, in order that appropriate exception routines can be applied to deal with such exception conditions. One example of such an exception condition is where one or more of the floating point numbers being compared are NaNs (Not a Number). It is clear that, irrespective of whether the comparison is performed in hardware or software, the time taken to determine whether such exception conditions exist will impact on the efficiency of the comparison process. For example, assuming a software approach, a generic check that detects whether either of two floating point numbers are NaNs takes 6 cycles, as illustrated by the following instruction sequence:

```
MOV     tmp, #0 x FFE00000
CMP     tmp, dOP1h, LSL #1
CMPEQ   dOP1l, #0              ; HI -> NaN found
CMPLS   tmp, dOP2h, LSL #1     ; no NaN, check opnd2
CMPEQ   dOP2l, #0
BHI     NaN_lab                ; NaN found -> exception
```

The MOV instruction stores the number 0×FFE00000 in the register tmp. The CMP instruction then compares the value of the first floating point number, shifted left by one position, with the number stored in the register tmp. In the embodiment to which the above instruction sequence relates, a floating point number is represented by a mantissa value, an exponent value, and a sign bit indicating whether the number is positive or negative, in double precision mode these three values comprising a total of 64 bits, with the top 32 bits including the sign bit, followed by the exponent, followed by the first part of the mantissa. Accordingly, the CMP instruction compares the top 32 bits of the first floating point number, shifted left by one to remove the sign bit, with the number stored in the register tmp, and thus it can be seen that this instruction compares the exponent of the first floating point number with the number stored in the register tmp.

A NaN shifted left by one will have a value greater than FFE00000 00000000. Hence, if the result of the first comparison is HI, i.e. the top 32 bits of the first floating point number shifted left by one was greater than FFE00000, this clearly indicates the presence of an NaN.

However, if the result of this first comparison was equal (i.e. the top 32 bits of the first floating point number shifted left by one was FFE00000), the instruction CMPEQ then compares the bottom 32 bits of the first floating point number with the number 0, since it is still possible that the first floating point number may be a NaN. Hence, if a HI signal is produced by either the first or second comparison, then this indicates that the first floating point number is a NaN.

If the result of the previous two comparisons were less than or equal, and hence an NaN was determined not to be present, the next two instructions then perform a similar comparison for the second floating point number, again a high signal indicating that a NaN has been found. The final instruction then branches to an exception routine called NaN_lab if a high signal has been produced.

It will be appreciated that the performance of such a check as part of each floating point compare operation introduces a significant overhead, and adversely affects the efficiency of the compare operation. It is an object of the present invention to alleviate this overhead.

SUMMARY OF THE INVENTION

Viewed from a first aspect, the present invention provides a method of comparing first and second floating point numbers to generate a result indicative of the comparison unless one or more exception conditions exist, comprising the steps of: (a) providing a hierarchy of tests arranged to identify from said first and second floating point numbers whether said one or more exception conditions exist, a first test in said hierarchy predicting whether said one or more exception conditions may exist, and each subsequent test in the hierarchy being arranged to determine with more accuracy than the previous test whether said one or more exception conditions exist, each test being arranged to generate a hit signal if that test predicts that said one or more exception conditions exist; (b) executing the first test in said hierarchy; (c) if the executed test does not generate a hit signal, branching to a compare function, and executing the compare function to generate the result indicative of the comparison of the first and second floating point numbers; (d) if the executed test generates a hit signal and is not a final test in the hierarchy, performing the steps of: (d)(i) branching to the next test in the hierarchy; (d)(ii) executing the test branched to at said step (d)(i); and (d)(iii) returning to said step (c); (e) if the executed test generates a hit signal and is the final test in the hierarchy, generating an exception signal indicating the presence of said one or more exception conditions.

In accordance with the present invention, a hierarchy of tests are provided to predict the presence of one or more exception conditions. The first test predicts whether the one or more exception conditions may exist, and preferably is a "catch all" test that identifies any situations where the one or more exception conditions may exist, including ones which ultimately may not give rise to an exception condition. If the test indicates that one or more exception conditions may exist, then a hit signal is generated and the method branches to a next test in the hierarchy, which is arranged to determine with more accuracy than the previous test whether said one or more exception conditions exist. Each time the hit signal is generated by a test, the process branches to the next, more accurate, test in the hierarchy, unless the test is the final test in the hierarchy, at which point an exception signal is generated to indicate the presence of said one or more exception conditions.

The benefit of this approach is that as soon as one of the tests does not produce a hit signal, i.e. the test has determined that the one or more exception conditions do not exist, the process can branch immediately to a compare function in order to generate a result indicative of the comparison of the first and second floating point numbers.

Generally speaking, the more accurate the test, the longer than test will take to perform, and accordingly the earlier tests in the hierarchy can be performed significantly quicker than a precise test which identifies definitely whether the one or more exception conditions exist. Accordingly, assuming that exception conditions occur relatively infrequently, it will be appreciated that the method of the present invention will enable most compare operations to branch relatively quickly to the compare function, without needing to perform more precise checks provided later in the hierarchy. Hence, such an approach significantly improves the efficiency of floating point comparisons over the known prior art software techniques.

In preferred embodiments, the hierarchy of tests includes a choice of first tests, each first test having subsequent tests dependent thereon, and the method further comprises the steps of, prior to said step (b): (i) determining whether either the first or second floating point number is negative; (ii) branching to a positive number first test if both the first and second floating point numbers are positive; (iii) branching to a negative number first test if either the first or second floating point number is negative.

It will be appreciated that the process for selecting a first test from a choice of first tests could be performed in any appropriate manner. For example, the method may instead comprise the steps of, prior to said step (b): (i) determining whether either the first or second floating point number is positive; (ii) branching to a negative number first test if both the first and second floating point numbers are negative; (iii) branching to a positive number first test if either the first or second floating point number is positive.

In preferred embodiments of the present invention, floating point numbers are represented by a sign bit, an exponent value, and a mantissa value. Both the exponent and mantissa are positive numbers. If the exponent of one floating point number is larger than the exponent of the other floating point number, then that number is larger. If the two exponent values are the same, then the floating point number with the larger mantissa will be the larger number. Accordingly, it will be appreciated that such floating point numbers behave like sign-magnitude numbers. Therefore, the exponent and mantissa can be compared together, rather than being separated.

Further, in preferred embodiments, it has been realised that unsigned comparisons can be used on sign-magnitude values, as illustrated by the following table:

| Sign of A, B - | instruction to use to test A >= B |
|---|---|
| +, + | CMP A, B (trivial) |
| -, - | CMP B, A (sign magnitude comparison of negative numbers) |
| +, - | CMP B, A (most significant bit of B set, so output of comparison always HI, i.e. A always larger than B) |
| -, + | CMP B, A (most significant bit of A set, so output of comparison always LO, i.e. B always larger than A) |

Accordingly, it was realised that in preferred embodiments only two cases need to be considered, namely the case where both numbers are positive, or the case where at least one or the numbers is negative. Hence, this is why in preferred embodiments a preliminary step is performed to determine whether either the first or second floating point number is negative, and to branch to an appropriate first test dependent on that determination.

In preferred embodiments, each floating point number includes a sign bit indicating whether the number is positive or negative, and said step (i) comprises the steps of: performing a logical operation on the first and second floating point numbers to produce a combined value; and determining from the sign bit of the combined value whether either the first or second floating point number is negative. More particularly, in preferred embodiments, the sign bit of each floating point number is set to a logic 0 value for a positive number and a logic 1 value for a negative number, and said logical operation is a logical OR operation performed on the first and second floating point numbers. Accordingly, it will be appreciated that, in this embodiment, if the sign bit of the combined value is at a logic 1 value, then at least one of the floating point numbers is a negative number.

In preferred embodiments, both the positive number first test and the negative number first test involve predicting from said combined value whether said one or more exception conditions may exist. As an example of these first tests, consider a situation where the exception condition to be determined is the situation where either the first or second floating point number is a NaN. In such instances, a large exponent would be expected, and accordingly the first test would preferably merely involve determining whether the exponent of the combined value exceeded a predetermined number.

In preferred embodiments, a second test branched to from the first test is arranged to apply separate tests to both the first and second floating point numbers to produce a more accurate prediction than was obtained from the first test using the combined value. Accordingly, having regard to the earlier mentioned example of looking for a NaN, the second test may apply a similar test to each floating point number separately as was applied in the first test to the combined value, in order to remove any "miss-hits" resulting from the fact that the first test was looking merely at the combined value.

Further, in preferred embodiments, the final test in the hierarchy is arranged to apply a precise test to both the first and second floating point numbers to identify whether said one or more exception conditions do exist. Hence, having regard to the example of looking for a NaN, any appropriate precise test may be performed at this point if the process proceeds as far as the final test. As mentioned earlier, it is expected that the presence of such exception conditions will be rare, and that accordingly it will be rare for the method of the present invention to get as far as the final test in the hierarchy without branching to the compare function, and that accordingly the overall efficiency of the compare process will be improved.

Further, it will be appreciated that in some embodiments, the final test need not be a precise test, but that rather it may still include some "miss-hits" when generating a hit signal. The exception handling code branched to as a result of the exception signal would then handle these "miss-hits" in addition to handling any true exception conditions. Even though the exception handling code will be invoked more often than it needs to be, the process may still be efficient, assuming a hit signal from the final test is rare.

It will be appreciated that the method of the present invention can be used to predict a number of different exception conditions. However, as mentioned earlier, in preferred embodiments the one or more exception conditions comprise either the first or second floating point number being a NaN.

In one embodiment, the method of the present invention may be arranged to compare whether the first floating point number is less than the second floating point number, the compare function comprising a first comparison operation used if both the first and second floating point numbers are positive, and a second comparison operation used if either the first or second floating point numbers are negative.

Furthermore, in preferred embodiments, the first and second comparison operations are arranged to directly produce as their result a number of flags indicating the result of the comparison. This is possible as a result of the way in which either the first compare function or second compare function is invoked through branching from an appropriate point in the hierarchy of tests, and avoids the typical prior art requirement of having to set the flags during additional cycles following the end of the comparison process.

Viewed from a second aspect, the present invention provides a data processing system for comparing first and second floating point numbers to generate a result indicative of the comparison unless one or more exception conditions exist, comprising: a storage for storing a hierarchy of tests arranged to identify from said first and second floating point numbers whether said one or more exception conditions exist, a first test in said hierarchy predicting whether said one or more exception conditions may exist, and each subsequent test in the hierarchy being arranged to determine with more accuracy than the previous test whether said one or more exception conditions exist, each test being arranged to generate a hit signal if that test predicts that said one or more exception conditions exist; a processor for executing the first test in said hierarchy; if the executed test does not generate a hit signal, the processor being arranged to branch to a compare function, and to execute the compare function to generate the result indicative of the comparison of the first and second floating point numbers; if the executed test generates a hit signal and is not a final test in the hierarchy, the processor being arranged to branch to the next test in the hierarchy and to execute that next test; if the executed test generates a hit signal and is the final test in the hierarchy, the processor being arranged to generate an exception signal indicating the presence of said one or more exception conditions; the processor being arranged to work trough the tests in the hierarchy until either the compare function is executed, or the exception signal is generated.

Viewed from a third aspect, the present invention provides a computer program for configuring a data processing system to perform a method of comparing first and second floating point numbers to generate a result indicative of the comparison unless one or more exception conditions exist, the method comprising the steps of: (a) providing a hierarchy of tests arranged to identify from said first and second floating point numbers whether said one or more exception conditions exist, a first test in said hierarchy predicting whether said one or more exception conditions may exist, and each subsequent test in the hierarchy being arranged to determine with more accuracy than the previous test whether said one or more exception conditions exist, each test being arranged to generate a hit signal if that test predicts that said one or more exception conditions exist; (b) executing the first test in said hierarchy; (c) if the executed test does not generate a hit signal, branching to a compare function, and executing the compare function to generate the result indicative of the comparison of the first and second floating point numbers; (d) if the executed test generates a hit signal and is not a final test in the hierarchy, performing the steps of: (d)(i) branching to the next test in the hierarchy; (d)(ii) executing the test branched to at said step (d)(i); and (d)(iii) returning to said step (c); (e) if the executed test generates a hit signal and is the final test in the hierarchy generating an exception signal indicating the presence of said one or more exception conditions.

Viewed from a fourth aspect, the present invention provides a computer program product on a computer readable medium comprising a computer program in accordance with the third aspect of the present invention.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
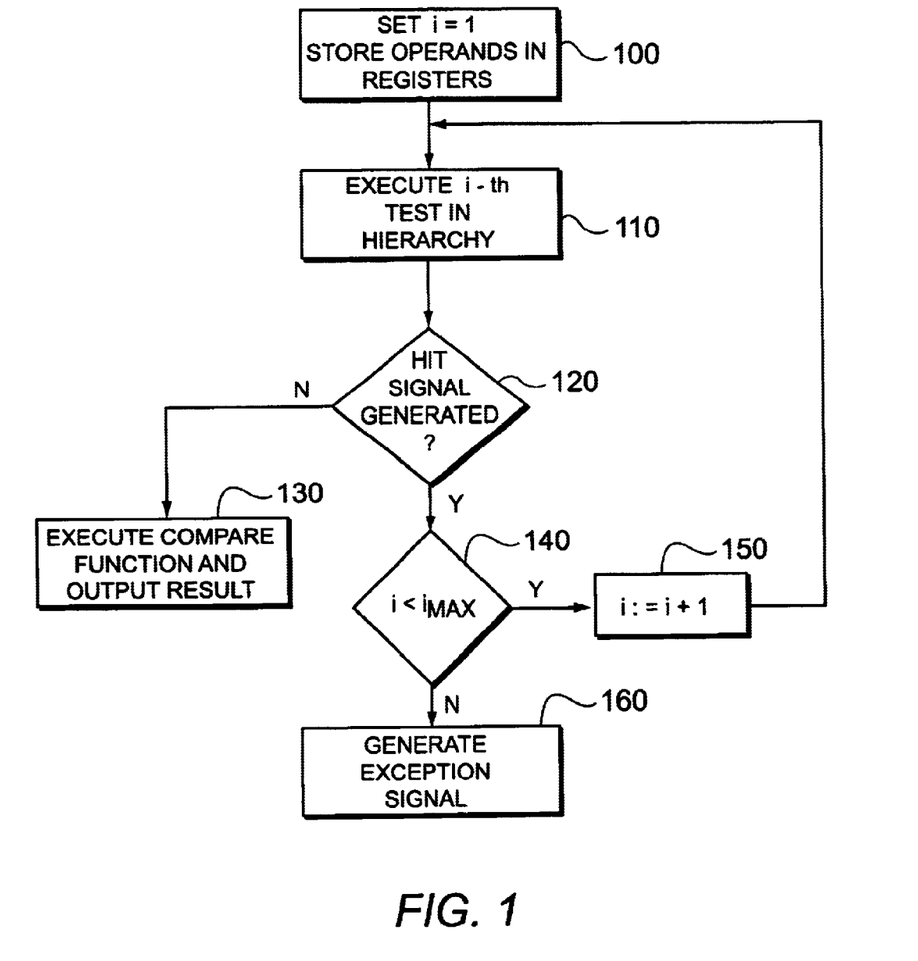
FIG. 1 is a flow diagram illustrating a comparison process performed in accordance with preferred embodiments of the present invention.

FIG. 1 is a flow diagram providing an overview of the comparison process of preferred embodiments of the present invention, in which the hierarchy of tests is used to determine whether one or more exception conditions exist. FIG. 1 illustrates one sequence of tests within the hierarchy, consisting of "i" tests, where $1 \leq i \leq 1_{MAX}$. However, as will be discussed in more detail later with reference to the example of FIG. 2, it is possible for the hierarchy of tests to comprise more than one sequence of tests, with an initial decision block being used to determine which sequence to apply for any particular comparison. Each sequence of tests within the hierarchy will in preferred embodiments be linked by the process illustrated in FIG. 1.

As illustrated in FIG. 1, the parameter i is initially set equal to 1 at step 100, and the two floating point numbers being compared, hereafter referred to as operands 1 and 2, are stored in registers. The process then proceeds to step 110, where the i-th test in the hierarchy is executed to identify, based on said first and second operands whether one or more exception conditions may exist.

Each test is arranged to generate a hit signal if it determines that the one or more exception conditions may exist, and accordingly as step 120 it is determined whether such a hit signal has indeed been generated. If a hit signal has not been generated, then this indicates that the one or more exception conditions do not exist, and that accordingly it is safe to proceed directly with the comparison process. Accordingly, in such situations, the process branches from step 120 to 130, where a predetermined compare function is executed in order to generate the results of the comparison of the first and second operands.

However, if a hit signal is generated, then this indicates that the one or more exception conditions may exist, and accordingly the process proceeds to step 140, where it is determined whether i is less than $i_{MAX}$, i.e. it is checked that the test just executed is not the last test in the hierarchy. Assuming that the test just executed is not the last test in the hierarchy, then i will indeed be less than $i_{MAX}$, and accordingly the process will proceed to step 150, where i is incremented by 1, after which the process returns to step 110 to execute the next test in the hierarchy.

If at step 140, it is determined that the last test in the hierarchy has been executed, then the process will proceed to step 160, where an exception signal is generated to indicate the presence of the one or more exception conditions. Standard exception handling routines can then be used to deal with the exception.

As mentioned previously, the tests in the hierarchy are arranged such that the first test is the least accurate, in that it will not only identify situations where the one or more exception conditions exist, but will also in all likelihood determine that the one or more exception conditions may exist in situations where they in fact do not exist, i.e. a number of miss-hits will be generated. The purpose of each subsequent test is to provide increasingly accurate predictions as to whether the one or more exception conditions do in fact exist, and hence each subsequent test will remove some of the miss-hits from the previous test. Preferably, the last test in the hierarchy is a precise test, which will only produce a hit signal if the one or more exception conditions do in fact exist, although this is not essential.

The benefit of this approach is that the initial, less accurate, tests are performed significantly more quickly than the more precise tests, and the absence of a hit signal from any particular test indicates that the one or more exception conditions do not exist, and that accordingly the compare function can be executed immediately. On the assumption that the one or more exception conditions occur rarely, then in most instances, the process will branch to step 130 to execute the compare function without the need to execute many of the tests in the hierarchy, accordingly yielding significant performance benefits. Obviously, if the one or more exception conditions do in fact exist, then all of the tests in the hierarchy will have to be performed in that instance, and this will often be less efficient that executing the precise test directly. Nevertheless, on the assumption that the occurrence of such exception conditions is rare, the process illustrated in FIG. 1 will typically yield significant performance improvements over the prior art approach where the precise test is executed each time a comparison of the two operands is to take place.

Figure 2:
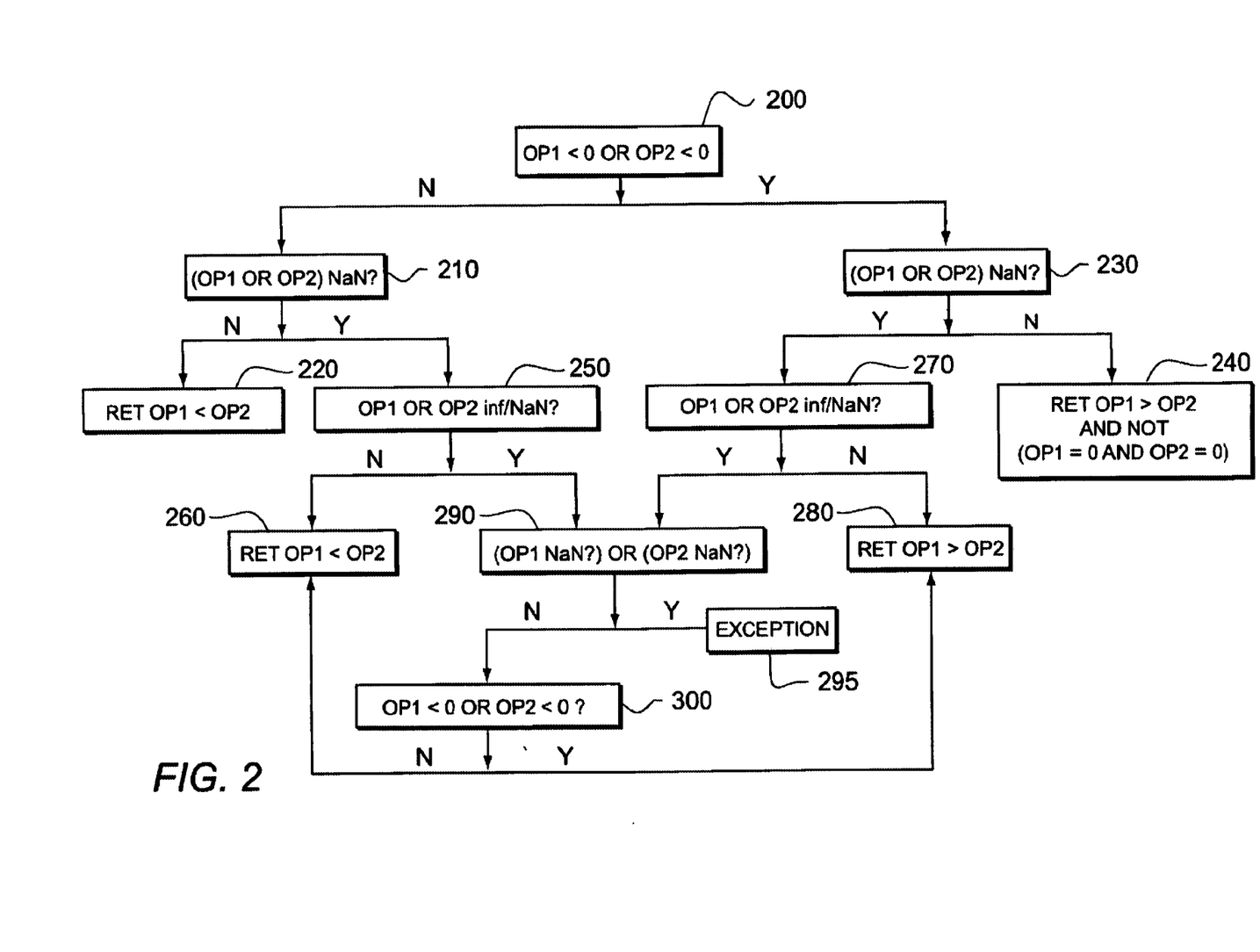
FIG. 2 is a flow diagram illustrating in more detail a comparison method employed in accordance with a preferred embodiment of the present invention.

FIG. 2 is a flow diagram illustrating in more detail a comparison process employed in preferred embodiments of the present invention, wherein the one or more exception conditions comprise either the first or second operand being a NaN (Not a Number). During a comparison of two floating point numbers, NaNs may cause an exception if they are "signalling NaNs" (as defined by the IEEE754–1985 Standard), and always compare as unordered if not signalling NaNs. Further, if either floating point number is an infinity, then those floating point numbers need to be treated as normal numbers, even though an infinity looks similar to a NaN. In addition, in the event that either operand is negative, then a special check is needed for +0=0, since the IEEE754–1985 Standard defines that +0=−0, even though the bit patterns are different.

The following discussion of FIG. 2 will include at appropriate points sample pseudo assembly code to illustrate a practical implementation of the steps illustrated in FIG. 2. The routine dcmp referred to below gets two double precision IEEE operands as input, called dOP1 and dOP2.

Assuming the processor of preferred embodiments is a 32-bit machine, each operand consist of 2 parts: a high word, containing sign, exponent and mantissa bits, and a low word, containing only mantissa bits. The high words are called dOP1h and dOP2h, the low words dOP1l and dOP2l. The routine uses one temporary register called tmp. The result of this routine is a set of condition code flags representing the result of the comparison as follows:

EQ−>dOP1=dOP2
NE−>dOP1<>dOP2
HI−>dOP1>dOP2
HS−>dOP1>=dOP2
LO−>dOP1<dOP2
LS−>dOP1<=dOP2

Looking now in more detail at the flow diagram of FIG. 2, this illustrates the comparison instruction flow for a comparison operation to determine whether operand 1 is less than operand 2. At step 200, it is determined whether either the first or second operand is negative. Hence, at this point, the routine dcmp is preferably invoked to initiate the comparison routine:

dcmp ; start of comparison routine

Firstly, a bitwise OR operation is performed to combine the two high words in order to determine whether both are positive or either of them are negative. The ORRS operation below performs the bitwise ORR and writes the result into a temporary register, while setting the condition code flags on the result. A MI-condition indicates that the most significant bit of tmp is set. Since IEEE doubles store the sign in this bit, MI means that one or both of the numbers was negative, and will cause the process to branch to a routine dcmp negative to deal with the comparison as illustrated below:

| ORRS | tmp, dOP1h, dOP2h | ; OR high words to check signs |
| BMI | dcmp_negative | ; branch if negative |

However, assuming it is determined that both operands are positive, the process proceeds to step 210, where a first test is performed to indicate whether a NaN may be present. In preferred embodiments a quick test on the combined value in tmp is performed to see if it looks like an NaN or infinite. The high word of a positive IEEE NaN is at least 0×7FF00000, so that value is used in the comparison, and a branch to a more elaborate checking routine is performed if the result is higher or equal (condition HS), as illustrated below:

| CMP | tmp, #0 × 7FF00000 | ; are combined operands infinite/NaN? |
| BHS | dcmp_check_NaN_pos | ; branch if larger or equal |

Assuming a HS result is not produced at step 210, then the process branches to step 220, where a compare process is performed to determine whether operand 1 is less than operand 2. At this stage, it is known that neither of the operands is a NaN or infinite, so a normal comparison can be performed. The high words are first compared. If they are equal, the low words are compared, whilst if not equal, the low words are not compared. After the comparison, the condition code flags contain the result of the comparison. The above comparison operation is illustrated as follows:

```
CMP      dOP1h, dOP2h    ; compare high words
CMPEQ    dOP1l, dOP2l    ; if equal, compare low words
RET                      ; return
```

Returning to step 200, if either of the operands was determined to be negative, then the process proceeds to step 230, where the routine dcmp negative is invoked. At step 230, a similar test to that performed at step 210 is performed. Hence, a quick test on the combined value in tmp is performed to see if it looks like a NaN or infinite. The high word of a negative IEEE NaN is at least 0xFFF00000, so this value is used in the comparison, and a branch to a more elaborate checking routine is performed if the result is higher or equal (condition HS), as illustrated below:

```
CMP  tmp, #0 x FFF00000       ; are combined operands infinite/NaN?
BHS  dcmp_check_NaN_neg       ; branch if larger or equal
```

Assuming the process performed at step 230 does not generate a HS result, and accordingly it is determined that neither of the operands is a NaN or infinite, the process proceeds directly to step 240, where a compare function is performed to generate a result indicating whether operand 1 is greater than operand 2. The comparison is non-trivial, since IEEE mandates that −0 and +0 are treated as equal (doing a normal comparison would incorrectly return not-equal). Therefore, it is first checked whether both operands are +0 or −0 as a special case. This is done by using a bitwise OR of the low and high words, with the high word shifted left by one so as to remove the sign-bit. If the first operand is zero, the second operand is checked for zero too, as illustrated below:

```
ORRS     tmp, dOP1l, dOP1h, LSL #1  ; is first operand +0 or -0?
ORREQS   tmp, dOP2l, dOP2h, LSL #1  ; if zero, is second operand +0
                                    ;   or -0?
```

If both comparisons are zero, the EQ condition is set.

Assuming both operands are not zero (NE), the high words are then compared. If the high words are equal, the low words are compared, whereas if they are not equal, the low words are not compared. Note that if both operands were zero, the low words are compared—this is fine since it is already known they were equal. The comparison is different from the positive case, since a sign-magnitude comparison is performed. The condition code flags contain the result of the comparison. The above comparison process is illustrated below:

```
CMPNE dOP2h, dOP1h    ; if not both operands zero, compare high
                      ;   words
CMPEQ dOP2l, dOP1l    ; if equal, compare low words
RET                   ; return
```

The quickest routes through FIG. 2 to obtain the result of the comparison process have now been discussed, these being via steps 200, 210 and 220 if both the operands are positive, and via steps 200, 230 and 240 if either or both operands are negative. Assuming a hit signal (e.g. HS result in preferred embodiments) is generated at steps 210 or 230, then the process cannot proceed directly to the comparison function, but instead branches to steps 250 or 270, respectively. Both of these tests are arranged to determine whether either the first operand or the second operand is either an infinity or a NaN, as mentioned earlier infinities and NaNs looking quite similar. With particular regard to step 250, we arrive here if the quick NaN check on the combined operands at step 210 failed (this happens around 10% of the time). A more accurate check on each of the operands separately is now performed. The first operand is compared first, and if it isn't an infinite or NaN (result is smaller: LO condition), the second operand is compared. If either of them are larger than 0x7FF00000, the process branches to a routine that handles infinites and NaNs. The above process can be illustrated as follows: dcmp_check_NaN_pos

```
CMP    dOP1h, #0 x       ; is operand1 an infinite/NaN?
       7FF00000
CMPLO  dOP2h, #0 x       ; if not, is operand2 an infinite/NaN?
       7FF00000
BHS    NaN_lab           ; if either Inf/NaN, handle elsewhere
```

Similarly, considering the step 270, we arrive here if the quick NaN check on the combined operands at step 230 failed (this happens around 10% of the time). A more accurate check on each of the operands separately is now performed. Since the operands can be either positive or negative, the check is more complex as it should ignore the sign. Therefore, all words are shifted left by one to remove the sign. The comparison is then against 0xFFE00000; again, if an operand is larger, it is an infinite or NaN. The first operand is compared first, and if it isn't an infinite or NaN (result is smaller: LO condition), the second operand is compared. If either of them are larger than 0xFFE00000, the process branches to a routine that handles infinites and NaNs. The above process can be illustrated as follows: dcmp_check_NaN_neg

```
MOV    tmp, #0 x FFE00000    ; create constant 0 x FFE00000
CMP    tmp, dOP1h, LSL #1    ; is operand1 an infinite/NaN?
CMPLO  tmp, dOP2h, LSL #1    ; if not, is operand2 an infinite/NaN?
BHS    NaN_lab               ; if either Inf/NaN, handle elsewhere
```

Assuming a hit signal (e.g. a HS result in preferred embodiments) is not produced at steps 250 or 270, this indicates that neither operand is a NaN or an infinite, and that accordingly the process can branch to the compare operation directly. Hence, having regard to step 250, this branches in the absence of a hit signal to step 260, where a comparison analogous to the one performed at step 220 is performed. We could repeat the same comparison code before returning. However, the less accurate test indicated that one of the operands could be an infinite. Therefore, the high words of the operands must be different, and hence the comparison on the low words can be skipped, saving an instruction. Thus, the process can be illustrated as follows:

```
CMP  dOP1h, dOP2h   ; dOP1h != dOP2h, so don't compare low words
RET                 ; return
```

Similarly, if no hit signal is generated at step 270, the process branches to step 280, where a process analogous to that performed at step 240 is executed. We could repeat the same negative comparison code before returning. However, zero operands can never be present here (zeroes don't look like NaNs), and so we can omit the special check on +0 and −0. Also the less accurate test indicated that one of the operands could be an infinite. Therefore, the high words of the operands must be different, and so the comparison on the low words can be skipped, saving an instruction. Thus, the process can be illustrated as follows:

| | | |
|---|---|---|
| CMP | dOP2h, dOP1h | ; dOP1h != dOP2h, so don't compare low words |
| RET | | ; return |

If either step 250 or step 270 produces a hit signal (e.g. a HS result in preferred embodiments), then the process branches to step 290, where in preferred embodiments a precise test is performed to determine whether either the first or second operand is a NaN. This can be illustrated as follows:
NaN_lab
<code to handle NaNs and infinities >
Depending on the system state, a value is returned indicating the comparison result or an IEEE exception is signalled.

It will be appreciated by those skilled in the art that any suitable test can be performed at this stage to determine precisely whether either operand is an NaN. Hence, as an example, the prior art precise test mentioned on page 1 of this application could be used to determine if a NaN exists.

If a HI result is generated as a result of this precise comparison, then the process branches to a suitable exception routine to deal with the exception. This branch to an exception routine is indicated by the block 295 in FIG. 2.

It will be appreciated by those skilled in the art that, in an alternative embodiment, a different test may be used to cause a branch to the exception routine. For example, in one embodiment, the exception routine could be branched to directly as a result of a hit signal from steps 250 or 270, with step 290 then being omitted.

If a HI result is not generated by the precise test, then it is clear that an infinite is present rather than a NaN. The infinite can then be handled as a normal operand, and so for example the pre-existing comparison routine may be used to deal with the comparison. This is illustrated by step 300 in FIG. 2, which determines whether either or both of the operands are negative. If both operands are positive, then the process branches to step 260, where the comparison operation is performed. Otherwise, the process branches to step 280 where the alternative comparison operation is performed.

From the above description, it can be seen that step 200 selects between the case where both operands are positive, or when at least one operand is negative. The second layer, represented by steps 210 or 230, provides a first quick test on the operands ORed together to determine whether they look like a NaN. This check is weak, in that it will typically get about 4% or 9% false hits for double precision and single precision, respectively, when none of the operands is a NaN. In general, false hits occur for very large numbers, or for both numbers being around 2.0 (one larger, one smaller).

If the operands are not categorised as NaNs in this second layer, a normal unsigned compare can be performed at steps 220 or 240 to produce the result of the comparison process. As illustrated in the example instruction sequences mentioned earlier, these unsigned compare processes can return the result immediately if the upper words of the operands are different. It should be noted that at step 240, the compare is done with the operands swapped, as the order is reversed for negative numbers. This step 240 process also checks for −0=+0 as a special case.

If a hit signal is produced in the second layer, i.e. at the first test, then in the third layer, a second, more precise test is performed, which filters out NaNs and infinities. As discussed earlier, these tests are indicated by the steps 250 and 270. Only if a hit signal is generated by either of these two tests is the final, precise test performed in the fourth layer at step 290. Otherwise, the appropriate comparison process is performed.

The exception handler will raise an invalid operation exception at step 295 if one of the operands is a signalling NaN.

Accordingly, in preferred embodiments, there are three different checks on NaNs, with increasing accuracy:
1. one of the operands looks like a NaN (but might not be);
2. one of the operands is infinite or NaN;
3. one of the operands is a NaN.

The compare routine that may be executed during the operation of the process of FIG. 2 can either be used as a boolean returning function, or as is a flags returning function (returning < as LO, <= as LS, > as HI, >= as HS, == as EQ, != as NE). It has been found that the above described comparison process is approximately three times as fast as a typical software prior art approach.

Figure 3:
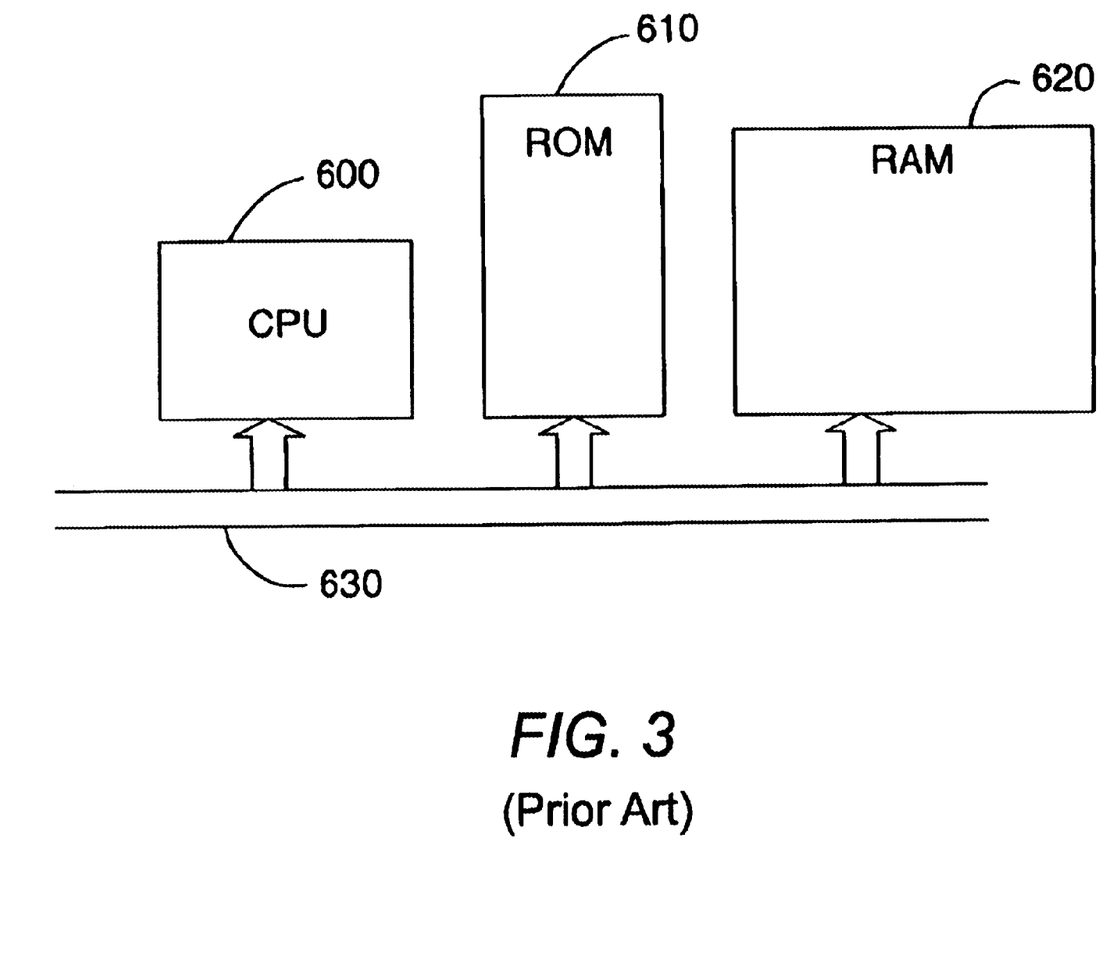
FIG. 3 illustrates a general purpose data processing system for performing the techniques described in relation to FIGS. 1 and 2.

FIG. 3 illustrates a typical data processing system that may be used to implement the techniques described above. A common bus 630 links a central processing unit 600, a random access memory 620 and a read only memory 610. In operation, software stored within the read only memory 610 or random access memory 620 may be executed by the central processing unit 600 to carry out the techniques described above. The system illustrated in FIG. 3 operates to perform the role of the various logic elements previously described.

The input operands for the compare operation and the results of the compare operation generated by the above described techniques would typically be stored in registers within the CPU, although the input operands may originate from the RAM 620.

As mentioned earlier, the compare routines that may be utilised in embodiments of the present invention may be used as a boolean returning function, this being the typical prior art approach. Hence, with reference to FIG. 2, boolean returning compare functions could be used at steps 220, 260, 240 and 280. Such functions would typically return a boolean value with the result of the comparison, and in most cases this boolean value would be tested immediately after return. Hence, for example, the following test might typically be performed to test whether a first operand x is greater than 0:
if (x>0.0)
  MOV R0, x
  MOV R1,#0.0
  CALL cmpgt
  CMP R0, #0
  BNE As can be seen from the above, MOV instructions are used to store the value x in register R0 and the value 0 in register R1. Then a compare function cmpgt is called to perform a comparison process to determine whether the first operand, i.e. x, is greater than the second operand, i.e. zero. This compare function will return a true value (i.e. a logic 1 value) if x is greater than zero. Since that return value is a boolean value, it must then be tested, and this is done via a CMP instruction that determines whether the value returned from the cmpgt operation (which will have been placed in register R0) is equal to zero, the result of this CMP instruction being a flag which is set to 1 if the contents of R0 are equal to zero, i.e. if x is not greater than zero. The BNE instruction is then used to branch to an appropriate function to be employed if x is greater than zero, this being done on the basis of the flag generated by the CMP instruction. Hence, it can be seen from the above that the result of the original cmpgt function needs to be tested to generate a flag, with that flag then being used to ensure that branching occurs under the correct condition.

However, in accordance with preferred embodiments of the present invention, different compare functions are executed, depending upon from where in the hierarchy of tests the compare function is branched to. Hence, with reference to FIG. 2, which is arranged to test whether operand 1 is less than operand 2, it can be seen that a first comparison operation is executed at step 220 and 260, whilst a second comparison operation is executed at steps 240 or 280. This enables the results of the compare function to be returned directly in the flags, without the need to execute a further compare instruction as illustrated in the above prior art approach. In particular, with reference to the above example, this instruction sequence can now be replaced by the following:

if (x >0.0)
  MOV R0, x
  MOV R1, #0.0
  CALL cmpgt
  BHI In this instance, the cmpgt function will automatically apply an appropriate compare function dependent upon where the comparison is invoked from within the hierarchy of tests, which automatically ensures that the result of the comparison can be used directly as a flag to ensure correct branching.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A method of comparing first and second floating point numbers to generate a result indicative of the comparison unless one or more exception conditions exist, comprising the steps of:

(a) providing a hierarchy of tests arranged to identify from said first and second floating point numbers whether said one or more exception conditions exist, a first test in said hierarchy predicting whether said one or more exception conditions exist, and each subsequent test in the hierarchy being arranged to determine with more accuracy than a previous test whether said one or more exception conditions exist, each test being arranged to generate a hit signal if that test predicts that said one or more exception conditions exist;

(b) executing the first test in said hierarchy;

(c) if the executed test does not generate a hit signal, branching to a compare function, and executing the compare function to generate the result indicative of the comparison of the first and second floating point numbers;

(d) if the executed test generates a hit signal and is not a final test in the hierarchy, performing the steps of:

(d)(i) branching to a next test in the hierarchy;

(d)(ii) executing the next test branched to at said step (d)(i); and (d)(iii) returning to said step (c);

(e) if the executed test generates a hit signal and is the final test in the hierarchy, generating an exception signal indicating a presence of said one or more exception conditions.

2. A method as claimed in claim 1, wherein the hierarchy of tests includes a choice of first tests, each first test having subsequent tests dependent thereon, and the method further comprises the steps of, prior to said step (b);

(i) determining whether either the first or second floating point number is negative;

(ii) branching to a positive number first test if both the first and second floating point numbers are positive;

(iii) branching to a negative number first test if either the first or second floating point numbers are negative.

3. A method as claimed in claim 2, wherein each floating point number includes a sign bit indicating whether the number is positive or negative, and said step (i) comprises the steps of:

performing a logical operation on the first and second floating point numbers to produce a combined value; and determining from the sign bit of the combined value whether either the first or second floating point number is negative.

4. A method as claimed in claim 3, wherein the sign bit of each floating point number is set to a logic 0 value for a positive number and a logic 1 value for a negative number, and said logical operation is a logical OR operation performed on the first and second floating point numbers.

5. A method as claimed in claim 3, wherein both the positive number first test and the negative number first test involve predicting from said combined value whether said one or more exception conditions may exist.

6. A method as claimed in claim 5, wherein a second test branched to from the first test is arranged to apply separate tests to both the first and second floating point numbers to produce a more accurate prediction than was obtained from the first test using the combined value.

7. A method as claimed in claim 6 wherein the final test in the hierarchy is arranged to apply a precise test to both the first and second floating point numbers to identify whether said one or more exception conditions do exist.

8. A method as claimed in claim 2, arranged to compare whether the first floating point number is less than the second floating point number, the compare function comprising a first comparison operation used if both the first and second floating point numbers are positive, and a second comparison operation used if either the first or second floating point numbers are negative.

9. A method as claimed in claim 8, wherein the first and second comparison operations are arranged to directly produce as their result a number of flags indicating the result of the comparison.

10. A method as claimed in claim 1, wherein said one or more exception conditions comprise either the first or second floating point number being a NaN (Not A Number).

11. A data processing system for comparing first and second floating point numbers to generate a result indicative of the comparison unless one or more exception conditions exist, comprising:

a storage for storing a hierarchy of tests arranged to identify from said first and second floating point numbers whether said one or more exception conditions exist, a first test in said hierarchy predicting whether said one or more exception conditions exist, and each subsequent test in the hierarchy being arranged to determine with more accuracy than a previous test whether said one or more exception conditions exist, each test being arranged to generate a hit signal if that test predicts that said one or more exception conditions exist;

a processor for executing the first test in said hierarchy and arranged to perform following tasks;

(a) if the executed test does not generate a hit signal, the processor being arranged to branch to a compare function, and to execute the compare function to generate the result indicative of the comparison of the first and second floating point numbers;

(b) if the executed test generates a hit signal and is not a final test in the hierarchy, the processor being arranged to branch to a next test in the hierarchy and to execute that next test, and to return to task (a); and (c) if the executed test generates a hit signal and is the final test in the hierarchy to generate an exception signal indicating a presence of said one or more exception conditions.

12. A data processing system as claimed in claim 11, wherein the hierarchy of tests includes a choice of first tests, each first test having subsequent tests dependent thereon, and the processor is arranged, prior to executing said first test, to determine whether either the first or second floating point number is negative, and to branch to a positive number first test if both the first and second floating point numbers are positive, or to branch to a negative number first test if either the first or second floating point number is negative.

13. A data processing system as claimed in claim 12, wherein both the positive number first test and the negative number first test involve predicting from a combined value formed from said first and second floating point numbers whether said one or more exception conditions may exist.

14. A data processing system as claimed in claim 13, wherein a second test branched to from the first test is arranged to apply separate tests to both the first and second floating point numbers to produce a more accurate prediction than was obtained from the first test using the combined value.

15. A data processing system as claimed in claim 14 wherein the final test in the hierarchy is arranged to apply a precise test to both the first and second floating point numbers to identify whether said one or more exception conditions do exist.

16. A data processing system as claimed in claim 12, arranged to compare whether the first floating point number is less than the second floating point number, the compare function comprising a first comparison operation used if both the first and second floating point numbers are positive, and a second comparison operation used if either the first or second floating point numbers are negative.

17. A data processing system as claimed in claim 16, wherein the first and second comparison operations are arranged to directly produce as their result a number of flags indicating the result of the comparison.

18. A data processing system as claimed in claim 11, wherein said one or more exception conditions comprise either the first or second floating point number being a NaN (Not A Number).

19. A computer program product on a computer readable medium comprising a computer program for configuring a data processing system to perform a method of comparing first and second floating point numbers to generate a result indicative of the comparison unless one or more exception conditions exist, the method comprising the steps of:

(a) providing a hierarchy of tests arranged to identify from said first and second floating point numbers whether said one or more exception conditions exist, a first test in said hierarchy predicting whether said one or more exception conditions a exist, and each subsequent test in the hierarchy being arranged to determine with more accuracy than a previous test whether said one or more exception conditions exist, each test being arranged to generate a hit signal if that test predicts that said one or more exception conditions exist;

(b) executing the first test in said hierarchy;

(c) if the executed test does not generate a hit signal, branching to a compare function, and executing the compare function to generate the result indicative of the comparison of the first and second floating point numbers;

(d) if the executed test generates a hit signal and is not a final test in the hierarchy, performing the steps of:

d)(i) branching to a next test in the hierarchy;

(d)(ii) executing the next test branched to at said step (d)(i); and (d)(iii) returning to said step (c);

(e) if the executed test generates a hit signal and is the final test in the hierarchy, generating an exception signal indicating a presence of said one or more exception conditions.

* * * * *